United States Patent Office 3,608,358
Patented Sept. 28, 1971

3,608,358
TESTING APPARATUS FOR DETERMINING THE MASS INERTIA MOMENT OF A SPECIMEN
Paul Holdinghausen, Bickenbach, Karl Homilius, Nieder-Ramstadt, and Peter-Uwe Schlechter, Darmstadt, Germany, assignors to Carl Schenck Maschinenfabrik GmbH, Darmstadt, Germany
Filed May 6, 1969, Ser. No. 822,156
Claims priority, application Germany, Aug. 10, 1968,
P 17 98 041.5
Int. Cl. G01m 1/12; G01n 3/22
U.S. Cl. 73—65         7 Claims

ABSTRACT OF THE DISCLOSURE

A receiver in operative proximity with a support rotatably supporting a specimen produces an output signal proportional to the angular velocity of the support and specimen. A signal proportional to the output signal is supplied to a drive for the support to apply to the support a torque corresponding to the angular velocity of the support and specimen. A control circuit connected between the receiver and the drive maintains the angle of oscillation of the support and specimen.

DESCRIPTION OF THE INVENTION

The present invention relates to testing apparatus for determining the mass inertia moment of a specimen. More particularly, the invention relates to testing apparatus for determining the moment of inertia of a specimen relative to a predetermined axis. The specimen is supported on a rotatably mounted support such as, for example, a rotatable table. A drive in operative proximity with the support imparts torsional vibrations to the support about the predetermined axis at the natural frequency of oscillation.

In testing apparatus of the type of the present invention, the specimen is affixed to a rotatable table and rotates therewith in rotary oscillation at the natural frequency of the system. The natural frequency of the system is due to the characteristics of springs affixed to the table and the moment of inertia of the oscillating mass, which mass comprises the rotary table and the specimen. Since the characteristics of the spring are known and since the moment of inertia of the rotary table is known, the moment of inertia of the specimen, about the axis of rotation, is determined in a known manner from the natural frequency.

The exact determination of the moment of inertia of a mass is extremely important, especially with regard to the construction of space vehicles. This is due to the fact that space vehicles often effect a rotary movement at a predetermined axis for stabilizing purposes.

During the testing of a specimen, the rotary oscillations are dampened to such an extent that such oscillations decay within a short period of time. The damping is caused by many factors such as, for example, air friction, mechanical friction, and the like. A good approximation to the damping is a moment proportional to the angular velocity. In known testing devices, the unavoidable damping has a considerably adverse effect upon the measuring process. Usually, only a limited number of individual oscillations is available for a frequency determination prior to complete decay of oscillations, so that such frequency determination is, of necessity, inaccurate. Furthermore, the natural frequency of the oscillatory system varies in accordance with the amplitude of oscillation, so that it makes an exact determination of the frequency impossible.

The principal object of the present invention is to provide new and improved testing apparatus for determining the moment of inertia of a specimen.

An object of the present invention is to provide testing apparatus for determining the moment of inertia of a specimen, which apparatus overcomes the disadvantages of similar known apparatus.

An object of the present invention is to provide testing apparatus for determining the moment of inertia of a specimen relative to a predetermined axis with accuracy, precision and reliability.

An object of the present invention is to provide testing apparatus for determining the moment of inertia of a specimen, which apparatus functions with efficiency, effectiveness, precision, accuracy and reliability.

In accordance with the present invention, testing apparatus for determining the moment of inertia of a specimen relative to a predetermined axis comprises a rotatably mounted support supporting the specimen. A drive in operative proximity with the support imparts torsional vibrations to the support about the predetermined axis at the natural frequency of oscillation. The rotatable support, and therefore the specimen, may thus oscillate at the natural frequency for any desired period of time. The individual oscillations may thus be accurately determined or counted. Such individual oscillations, which occur at predetermined intervals of time, determine the natural frequency, or the period of time required for a specific number of individual oscillations. Furthermore, any dependence of the natural frequency upon the amplitude of oscillation has no influence upon the measurement result. A receiver in operative proximity with the support produces an output signal proportional to the angular velocity of the support and specimen. An amplifier connected to the receiver amplifies the output signal of the receiver. A coupling circuit couples the amplifier to the drive for supplying to the drive a signal for applying to the support a torque corresponding to the angular velocity of the support and specimen.

A control circuit is connected between the amplifier and the drive for maintaining the angle of oscillation of the support and specimen. The control circuit comprises an integrator connected to the amplifier for converting the output signal of the receiver into a signal which is proportional to the angle of rotation. Electronic switches are coupled to the integrator for instantaneously detecting a magnitude corresponding to the peak value of the signal produced by the integrator. A source of reference signals iss provided for the angle of oscillation of the support and specimen. A comparator has inputs coupled to the electronic switches, an input connected to the source of reference signals and an output connected to the coupling circuit for controlling the drive in accordance with the difference between the actual angle of rotation and the reference angle of rotation. The reference signal supplied to the control circuit is thus proportional to the amplitude of oscillation, since the peak value of the signal is proportional to the angle of rotation or the angle of oscillation. The support, and therefore the specimen, is thus rapidly controlled to the desired amplitude of oscillation and such amplitude of oscillation is then maintained. The reference value supplied to the comparator may be varied in any suitable known manner in order to vary the desired amplitude of oscillation. A variable resistor may be connected between the amplifier and the control circuit for varying the amplitude of the signal supplied to the integrator of the control circuit, to thereby effect a variation in the reference value.

The electronic switches of the control circuit comprise controlled rectifiers and memories connected in series therewith for instantaneously detecting and transferring to the comparator a magnitude corresponding to the peak value of the signal produced by the integrator. Each memory may comprise a capacitor and a field effect transistor. The output signal of the electronic switches is thus a direct voltage which is proportional to the amplitude of oscillation. A Schmitt trigger circuit and a monostable multivibrator are connected in series circuit arrangement. The series circuit arrangement is connected between the integrator and the electronic switches of the control circuit. One of the inputs of the comparator is a positive polarity input and another of the inputs of the comparator is a negative polarity input. The electronic switches supply to the positive polarity input a magnitude corresponding to the positive peak value of the signal produced by the integrator. The electronic switches supply to the negative polarity input a magnitude corresponding to the negative peak value of the signal produced by the integrator. This provides the advantage that during a complete rotation or cycle of oscillation, the amplitude of oscillation is available twice, once as the positive peak value and once as the negative peak value, for comparison with the reference value.

The coupling circuit includes a photosensitive resistor for controlling the signal supplied to the drive. A source of light in operative proximity with the resistor varies the resistance thereof in accordance with the light produced thereby. The source of light is connected to the output of the comparator of the control circuit. The intensity of light is controlled by the current supplied to the lamp by the comparator. In this manner, the direct voltage output of the comparator varies the current flowing through the source of light and thereby varies the electrical resistance of the photosensitive resistor. This results in a variation of the amplitude of oscillation of the support.

The coupling circuit comprises an additional amplifier having an output connected to the drive, a positive polarity input and a negative polarity input. The photosensitive resistor is connected between the amplifier and the negative polarity input of the additional amplifier for controlling the signal supplied to the drive to produce an accelerating moment in the support via the drive. The source of light, connected to the output of the comparator of the control circuit varies the resistance of the photosensitive resistor in accordance with the light produced thereby. The coupling circuit further comprises a variable resistor connected between the amplifier and the positive polarity input of the additional amplifier for controlling the signal supplied to the drive to produce a decelerating moment in the support via the drive. The opposing forces of acceleration and deceleration produce a beneficial time response in the apparatus. If the amplitude of oscillation is to be rapidly controlled, only the moment of acceleration need be decreased. A decrease in the amplitude of oscillation occurs only to a degree which is a result of damping in the system. In the apparatus of the present invention, the decrease in the moment of acceleration is produced by the adjustable moment of deceleration.

In order that the present invention may be readily carried into effect, it will now be described with reference to the accompanying drawings, wherein.

Figure 1:
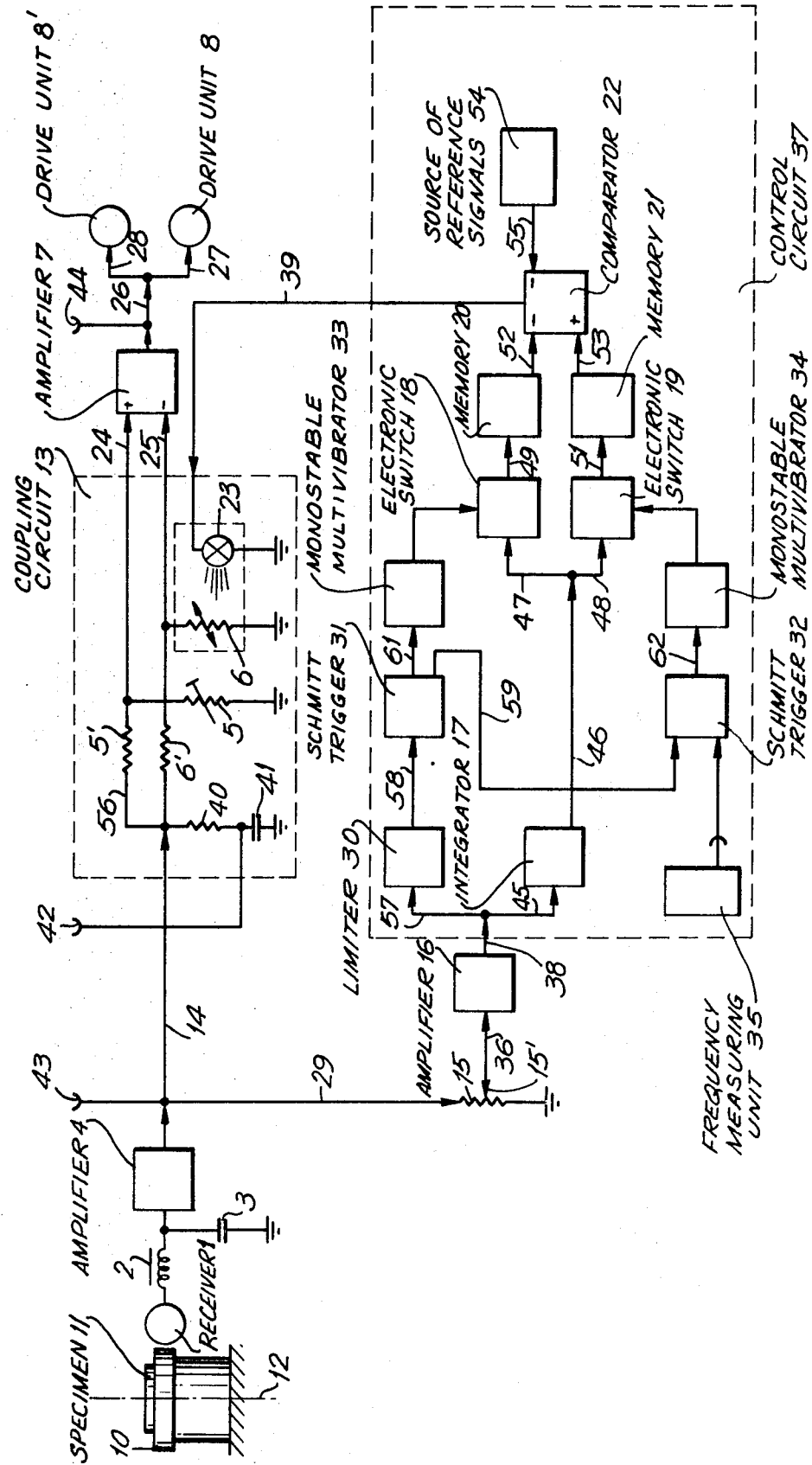
FIG. 1 is a block circuit diagram of an embodiment of the testing apparatus of the present invention for determining the moment of inertia of a specimen relative to a predetermined axis.

In FIG. 1, a rotatably mounted support or rotatable table 10 supports a specimen 11 for rotation therewith about a predetermined axis 12. A drive, comprising drive units 8 and 8', is provided in operative proximity with the support 10, although in order to maintain the clarity of illustration the drawing does not show the drive units adjacent the support. The drive units 8, 8' impart torsional vibrations to the support 10 about the predetermined axis 12 at the natural frequency of oscillation. The support 10 thus oscillates about the axis 12 by rotating about said axis first in one direction and then in the opposite direction. A receiver 1 is positioned in operative proximity with the support 10 and produces an output signal proportional to the angular velocity of said support and the specimen 11. The receiver 1 may comprise any suitable oscillation pickup or detector, such as, for example, an electrodynamic device of known type. An inductor 2 and a capacitor 3 connected in parallel with said inductor, function to suppress parasitic oscillations of higher frequencies. The inductor 2 is connected between the output of the receiver 1 and the input of an amplifier 4. The amplifier 4 functions to amplify the output signal of the receiver 1.

The amplified output signal of the receiver 1 is supplied to the input of a coupling circuit 13 via a lead 14. The outputs of the coupling circuit 13 are connected to the positive polarity input of an additional amplifier 7 via a lead 24 and to the negative polarity input of said additional amplifier via a lead 25.

The output of the additional amplifier 7 is connected in common to the drive units 8 and 8' via leads 26, 27 and 28. Each of the drive units 8 and 8' may comprise, for example, any suitable drive means such as, for example, an electromagnetic vibrator. The driving moments applied to the support 10 by the drive units 8 and 8', are in the same direction as the angular velocity of said support, as detected by the receiver 1. The support 10 is thus driven at its natural frequency. The coupling circuit functions to couple the amplifier 4 to the drive 8, 8' for supplying to said drive a signal for applying to the support 10 a torque corresponding to the angular velocity of said support and the specimen 11.

The output of the amplifier 4 is also connected to the input of an amplifier 16 via a lead 29 and a variable resistor 15. One end of the variable resistor 15 is connected to the lead 29 and the other end of said variable resistor is connected to ground. The variable resistor 15 has a slidable contact 15' which is connected to the input of the amplifier 16 via a lead 36.

The output of the amplifier 16 is connected to the input of a control circuit 37 via a lead 38. The output of the control circuit 37 is connected to an input of the coupling circuit 13 via a lead 39. The control circuit 37 functions to maintain the angle or amplitude of oscillation of the support 10, and therefore of the specimen 11.

The control circuit 37 comprises an integrator 17. The output of the amplifier 16 is connected to the input of the integrator 17 via the lead 38 and a lead 45. The integrator 17 converts the output signal of the receiver 1 into a signal which is proportional to the angle of rotation of the support 10. The output voltage of the integrator 17 is thus proportional to the angle of rotation of the support 10. The peak value of the output signal of the integrator 17 thus corresponds to the amplitude of oscillation of the support 10.

The output of the integrator 17 is connected in common to the inputs of electronic switches 18 and 19 via leads 46, 47 and 48. The electronic switch 18 instantaneously detects a magnitude corresponding to the negative peak value of the signal produced by the integrator 17 and the electronic switch 19 instantaneously detects a magnitude corresponding to the positive peak value of said signal. A memory 20 is connected in series with the electronic switch 18 via a lead 49 and a memory 21 is connected in series with the electronic switch 19 via a lead 51. Each of the electronic switches 18 and 19 may comprise any suitable electronic switch such as, for example, a controlled rectifier, such as, for example, a semiconductor controlled rectifier. Each of the memories 20 and 21 may comprise any suitable memory such as, for example, a capacitor and field effect transistor. The memory 20 produces a DC output having a magnitude which corresponds to the negative peak value of the signal proportional to the angle of rotation and the memory 21 produces a DC output voltage having a magnitude which corresponds to the positive peak value of said signal.

A comparator 22, which may comprise any suitable comparison circuit such as, for example, a difference amplifier, has a negative polarity input connected to the output of the memory 20 via a lead 52 and a positive polarity input connected to the output of the memory 21 via a lead 53. A source of reference signals 54 supplies reference signals for the angle of oscillation of the support 10 to another negative polarity input of the comparator 22 via a lead 55. The output of the comparator 22 is connected to an input of the coupling circuit 13 via the lead 39. The comparator 22 functions to compare the actual angle of oscillation, as supplied to it by the memories 20 and 21, and the reference value of the angle of rotation. The comparator 22 produces an output voltage proportional to the difference between the actual and reference angles of rotation.

The coupling circuit 13 comprises a source of light or lamp 23 which is connected in the lead 39 to ground. The light produced by the light source 23 impinges upon a photosensitive resistor 6 which is in operative proximity with said source of light. Variaton of the output voltage of the comparator 22 varies the current supplied to the source of light 23 accordingly, so that the electrical resistance value of the photosensitive resistor 6 is varied in accordance with the variation of the output voltage of said comparator. The photosensitive resistor 6 is connected between the output of the amplifier 4 and the negative polarity input of the additional amplifier 7 via the lead 14, a resistor 6' connected in said lead and the lead 25, so that variation of the resistance of said photosensitive resistor varies the magnitude of the signal supplied to said negative polarity terminal. Such signal is proportional to the angle of rotation of the specimen 11.

A variable resistor 5 is connected between the output of the amplifier 4 and the positive polarity input of the additional amplifier 7 via the lead 14, a lead 56, a resistor 5' connected in said lead and the lead 24. Variation of the resistor 5 varies the magnitude of the signal proportional to the angle of rotation of the support 10. When the resistance of the photosensitive resistor 6 is varied, the signal supplied to the drive units 8 and 8' is varied in a manner whereby said drive units produce an accelerating moment in the support 10. When the resistance of the variable resistor 5 is varied, the signal supplied to the drive units 8 and 8' is varied in a manner whereby said drive units produce a decelerating moment in the support 10.

A short pulse at the time of the positive and negative peaks of the signal proportional to the angle of rotation is required to control the electronic switches 18 and 19. The control pulses for the electronic switches are produced by a pulse limiter 30 having an input connected to the output of the amplifier 16 via the lead 38 and a lead 57. The limiter 30 may comprise any suitable limiter and functions to increase the slopes of the pulses. The output signal produced by the limiter 30 has edges which are positioned at the zero level of the signal which is proportional to the angular velocity, so that such edges coincide in time with the positive and negative peaks of the signal proportional to the angle of rotation.

The pulses produced by the limiter 30 are supplied to the input of a Schmitt trigger circuit 31 via a lead 58 and to the input of a Schmitt trigger circuit 32 via a lead 59. A monostable multivibrator 33 is connected in series circuit arrangement with the Schmitt trigger 31 via a lead 61. A monostable multivibrator 34 is connected in series circuit arrangement with the Schmitt trigger circuit 32 via a lead 62. The series circuit arrangement 31, 61, 33 is connected between the output of the limiter 30 and an input of the electronic switch 18. The series circuit arrangement 32, 62, 34 is connected between the Schmitt trigger circuit 31 and an input of the electronic switch 19.

The desired amplitude of oscillation is set in the apparatus of the present invention by variation of the variable resistor 15. More particularly, the movable contact 15' of the variable resistor 15 is adjusted to provide the desired amplitude of oscillation. A frequency measuring unit 35 of any suitable type is connected to the Schmitt trigger circuit 32 and provides an indication of the natural frequency of the oscillating system.

An integrating circuit comprises a resistor 40 and a capacitor 41 connected in series circuit arrangement between the lead 14 and a point at ground potential. An electrical output terminal 44 is connected to the lead 26. point in the connection between the resistor 40 and the capacitor 41. A cathode ray oscilloscope may be constructed to the output terminal 42 for the purpose of illustrating the angle of rotation of the support 10.

An electrical output terminal 43 is connected to the lead 14. A cathode ray oscilloscope may be connected to the electrical output terminal 43 for the purpose of illustrating the angular velocity of the support 10. An electrical output terminal 44 is connected to the lead 26. A cathode ray oscilloscope may be connected to the electrical output terminal 44 to illustrate the driving torque applied to the support 10.

The support or table 10 may be driven in a manner whereby the specimen 11 oscillates in a sawtooth manner.

Figure 2:
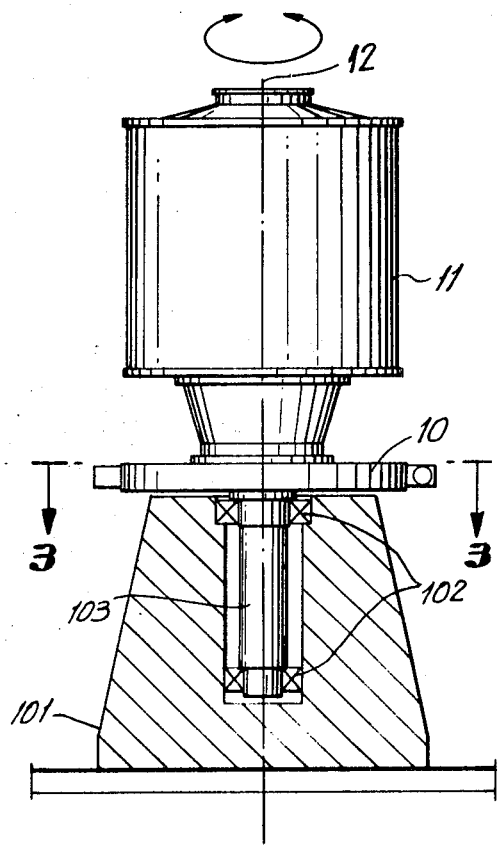
FIG. 2 is a view, partly in section, of an embodiment of the testing apparatus of the present invention.
Figure 3:
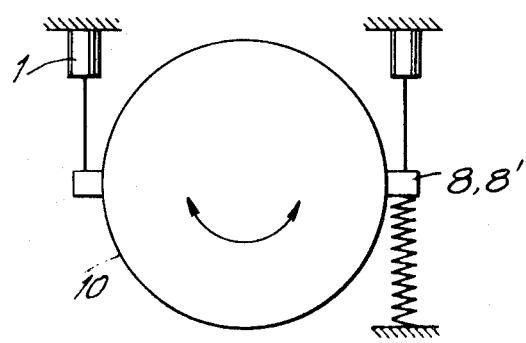
FIG. 3 is a view taken along the lines 3—3 of FIG. 2.

A feasible embodiment of the testing apparatus according to the invention is disclosed in greater detail with reference to FIGS. 2 and 3. In FIGS. 2 and 3, a shaft 103 is positioned vertically in bearings 102 in a base frame 101. The bearings 102 have the lowest possible friction. The table or support 10 is mounted on the upper end of the shaft 103. As shown in FIG. 3, the support 10 has elongations, projections or protrusions at two diametrically opposed places. The protrusions are alternately engaged by the coil of the receiver 1 and by the drive units 8 and 8'. A spring restoring force is tangentially simultaneously applied. The spring may be affixed at one end to the machine frame, for example, While the invention has been described by means of a specific example and in a specific embodiment, we do not wish to be limited thereto, for obvious modifications will occur to those skilled in the art without departing from the spirit and scope of the invention.

We claim:

1. Testing apparatus for determining the moment of inertia of a specimen relative to a predetermined axis, said testing apparatus comprising rotatably mounted support means supporting said specimen; driving means in operative proximity with said support means for imparting torsional vibrations to said support means about said predetermined axis at the natural frequency of oscillation; said support means being spring-biased for restoring said support means to an initial angular position thereof; electromechanical receiving means in operative proximity with said support means for producing an output signal proportional to the angular velocity of said support means and specimen; amplifying means connected to said receiving means for amplifying the output signal of said receiving means; coupling means coupling said amplifying means to said driving means for supplying to said driving means a signal for applying to said support means a torque corresponding to said angular velocity of said support means and specimen, said coupling means including an adjusting device for adjusting said torque in accordance with a difference between the actual angle of rotation and a reference angle of rotation, control means for maintaining constant the angle of oscillation of said support means and specimen, said control means comprising integrating means having an input coupled to an output of said amplifying means for converting the output signal of said receiving means into a signal which is proportional to the angle of rotation, a device for comparing a nominal and an actual value having input means, electronic switching means coupled to said integrating means for detecting in shortest possible time a magnitude corresponding to the peak value of the signal produced by said integrating means, said electronic switching means being coupled to the input means of said nominal and actual value comparing device, a source of reference signals for the angle of oscillation of said support means and specimen, said nominal and actual value comparing device also having an input connected to said source of reference signals and an output connected to said adjustment device of said coupling means for controlling said driving means in accordance with the difference between the actual angle of rotation and the reference angle of rotation, and means for measuring the frequency of oscillation coupled to said electronic switching means.

2. Testing apparatus as claimed in claim 1, further comprising a variable resistor connected between said amplifying means and said control means for varying the amplitude of the signal supplied to the integrating means of said control means.

3. Testing apparatus as claimed in claim 1, wherein the electronic switching means of said control means comprises controlled rectifier means and memory means connected in series therewith for detecting in shortest possible time and transferring to said comparator means a magnitude corresponding to the peak value of the signal produced by said integrating means.

4. Testing apparatus as claimed in claim 3, wherein said control means further comprises Schmitt trigger circuit means and monostable multivibrator means connected in series circuit arrangement therewith, said series circuit arrangement being connected between the integrating means and the electronic switching means of said control means for controlling said electronic switching means.

5. Testing apparatus as claimed in claim 1, wherein the input means of the comparator means of said control means comprises a positive polarity input and a negative polarity input, and said electronic switching means supplies to said positive polarity input a magnitude corresponding to the positive peak value of the signal produced by said integrating means and said electronic switching means supplies to said negative polarity input a magnitude corresponding to the negative peak value of the signal produced by said integrating means.

6. Testing apparatus as claimed in claim 1, wherein said coupling means includes a photosensitive resistor for controlling the signal supplied to said driving means and a source of light in operative proximity with said resistor for varying the resistance thereof in accordance with the light produced thereby, said source of light being connected to the output of the comparator means of said control means.

7. Testing apparatus as claimed in claim 1, wherein said coupling means comprises additional amplifying means having an output connected to said driving means, a positive polarity input and a negative polarity input, a photosensitive resistor connected between said amplifying means and the negative polarity input of said additional amplifying means for controlling the signal supplied to said driving means to produce an accelerating moment in said support means via said driving means and a source of light in operative proximity with said resistor for varying the resistance thereof in accordance with the light produced thereby, said source of light being connected to the output of the comparator means of said control means, and a variable resistor connected between said amplifying means and the positive polarity input of said additional amplifying means for controlling the signal supplied to said driving means to produce a decelerating moment in said support means via said driving means.

References Cited
UNITED STATES PATENTS

| | | | |
|---|---|---|---|
| 3,082,381 | 3/1963 | Morrill et al. | 330—59 |
| 3,167,722 | 1/1965 | Weller | 330—59 |
| 3,202,926 | 8/1965 | Ford et al. | 330—59 |
| 3,277,700 | 10/1966 | Myerholtz | 73—99 |
| 3,313,148 | 4/1967 | Dautreppe et al. | 73—99 |
| 3,416,362 | 12/1968 | McGahan | 73—65 |
| 3,471,700 | 10/1969 | Presti | 250—206 |
| 3,501,952 | 3/1970 | Gergen et al. | 73—15.6 |

FOREIGN PATENTS

| | | | |
|---|---|---|---|
| 139,858 | 11/1961 | U.S.S.R. | 42K |

RICHARD C. QUEISSER, Primary Examiner

J. WHALEN, Assistant Examiner

U.S. Cl. X.R.

73—99, 383